(12) United States Patent
Rochelle et al.

(10) Patent No.: US 8,070,856 B2
(45) Date of Patent: Dec. 6, 2011

(54) POLYAMINE/ALKALI SALT BLENDS FOR CARBON DIOXIDE REMOVAL FROM GAS STREAMS

(75) Inventors: Gary T. Rochelle, Austin, TX (US); John Cullinane, Houston, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 910 days.

(21) Appl. No.: 10/551,834

(22) PCT Filed: Apr. 1, 2004

(86) PCT No.: PCT/US2004/009962
§ 371 (c)(1),
(2), (4) Date: Oct. 17, 2006

(87) PCT Pub. No.: WO2004/089512
PCT Pub. Date: Oct. 21, 2004

(65) Prior Publication Data
US 2007/0044658 A1    Mar. 1, 2007

Related U.S. Application Data

(60) Provisional application No. 60/460,532, filed on Apr. 4, 2003.

(51) Int. Cl.
*B01D 53/14* (2006.01)
(52) U.S. Cl. .......................... 95/236; 423/228
(58) Field of Classification Search .............. 95/36, 149, 95/193, 216, 187, 230, 236, 6; 423/220, 423/223, 228
See application file for complete search history.

(56) References Cited

U.S. PATENT DOCUMENTS

| | | | | |
|---|---|---|---|---|
| 2,864,799 A | * | 12/1958 | De Groote et al. | 525/490 |
| 4,094,957 A | | 6/1978 | Sartori et al. | 423/223 |
| 4,112,050 A | | 9/1978 | Sartori et al. | 423/223 |
| 4,217,237 A | * | 8/1980 | Sartori et al. | 252/192 |
| 4,217,238 A | | 8/1980 | Sartori et al. | 252/192 |
| 4,336,233 A | | 6/1982 | Appl et al. | 423/228 |

(Continued)

FOREIGN PATENT DOCUMENTS

GB    1063517    12/1963

(Continued)

OTHER PUBLICATIONS

Sanjay Bishnoi and Gary Rochelle, "Absorption of carbon dioxide into aqueous piperazine: reaction kinetics, mass transfer and solubility", Nov. 2000, Chemical Engineering Science, vol. 55, issue 22, pp. 5531-5543.*

(Continued)

*Primary Examiner* — Duane Smith
*Assistant Examiner* — Thomas McKenzie
(74) *Attorney, Agent, or Firm* — Fulbright & Jaworski L.L.P.

(57) ABSTRACT

Novel solvents and methods of use for the removal of $CO_2$ from flue gas, natural gas, hydrogen gas, synthesis gas, and other process and waste gas streams are provided. The solvent contains an alkali salt such as potassium carbonate and a polyamine such as piperazine (PZ) where the polyamine concentration is at least 1.5 equivalents/Kg $H_2O$ and the alkali salt concentration is at least 0.5 equivalents/Kg $H_2O$. The preferred alkali salt/polyamine ratio is from approximately 1:2 to 2:1, and no additional alcohol is required for solubilizng the PZ. This chemical solvent and method of use provides efficient and effective removal of $CO_2$ from gaseous streams and other sources.

35 Claims, 3 Drawing Sheets

U.S. PATENT DOCUMENTS

Figure 1:
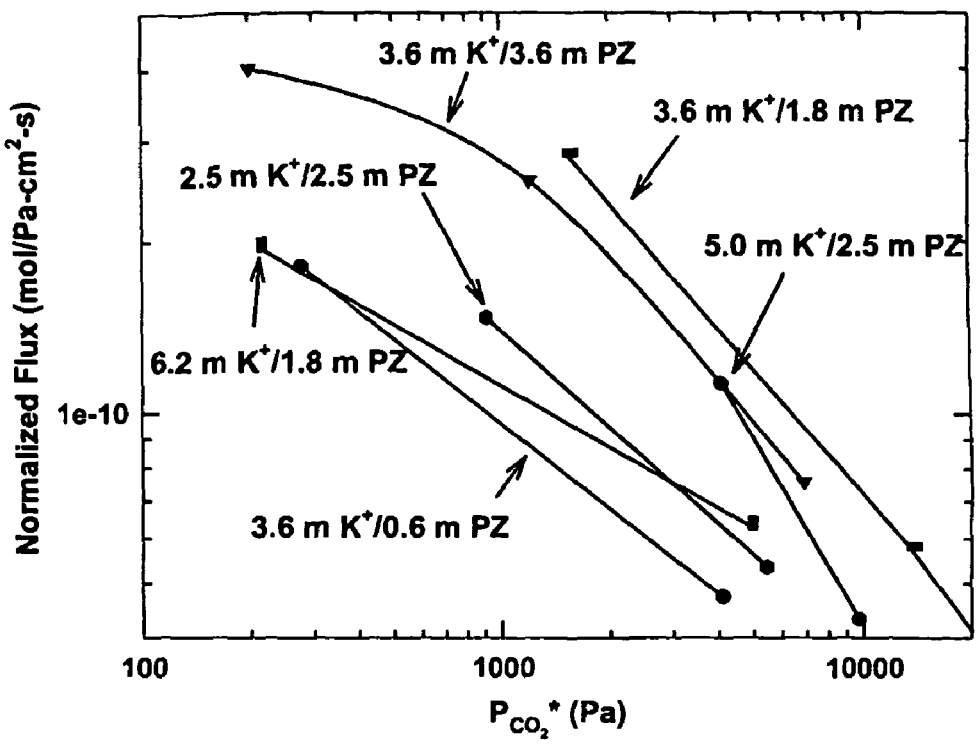

| | | | | |
|---|---|---|---|---|
| 4,581,209 | A | | 4/1986 | Oswald et al. ............... 423/223 |
| 5,017,350 | A | * | 5/1991 | Hakka et al. ............... 423/242.7 |
| 5,853,680 | A | * | 12/1998 | Iijima et al. ................... 423/220 |
| 6,036,931 | A | | 3/2000 | Yoshida et al. ............... 423/228 |
| 6,337,059 | B1 | | 1/2002 | Schubert et al. ............. 423/210 |
| 6,416,568 | B1 | | 7/2002 | Wallace et al. .................... 95/55 |
| 6,436,174 | B1 | * | 8/2002 | Grossmann et al. ............ 95/191 |
| 2002/0134241 | A1 | * | 9/2002 | Butwell et al. .................... 95/99 |

FOREIGN PATENT DOCUMENTS

| | | |
|---|---|---|
| JP | 53-081490 | 7/1978 |
| JP | 52-005679 | 8/1980 |
| JP | 61-071819 | 4/1986 |
| JP | 01-159021 | 2/1991 |
| JP | 2002-519171 | 7/2002 |

OTHER PUBLICATIONS

"Absorption of carbon dioxide into aqueous piperazine: reaction kinetics, mass transfer and solubility", Sanjay Bishnoi and Gary Rochelle, Chemical Engineering Science, vol. 55, issue 22, Nov. 2000, pp. 5531-5543.*

Bishnoi and Rochelle, "Absorption of carbon dioxide into aqueous piperazine: reaction kinetics, mass transfer and solubility," *Chemical Engineering Science*, 55:5531-5543, 2000.

Bishnoi, "Carbon dioxide absorption and solution equilibrium in piperazine activated methyldiethanolamine," *Doctor of Philosophy Dissertation*, The University of Texas at Austin, 2000.

Bocard and Mayland, "New charts for hot carbonate process," *Hydroc. Proc. & Pet. Ref.*, 41:128, 1962.

Cullinane and Rochelle, "Aqueous potassium carbonate and piperazine mixtures for $CO_2$ removal from flue gas," *Research Review Meeting*, Oct. 23, 2002.

Cullinane and Rochelle, "Carbon dioxide absorption with aqueous potassium carbonate promoted by piperazine," *Greenhouse Gas Treating Conference6*, Sep. 31 to Oct. 4, 2002.

Cullinane, "Carbon dioxide absorption in aqueous mixtures of potassium carbonate and piperazine," *M.S. Thesis*, The University of Texas at Austin, May 2002.

Dang, "$CO_2$ absorption rate and solubility in monethanolamine/piperazine/water," *Master of Science Thesis*, The University of Texas at Austin, 2001.

Freguia and Rochelle, "Modeling of $CO_2$ absorption/stripping process with MEA," *SRP Meeting*, Apr. 16, 2002.

Goff and Rochelle, "Oxidative degradation of aqueous monoethanolamine in $CO_2$ capture systems under absorber conditions," *Greenhouse Gas Treating Conferencel 6*, Oct. 1, 2002.

Pacheco et al., "$CO_2$ absorption into aqueous mixtures of diglyocolamine and methyldiethanolamine," *Chemical Engineering Science*, 55:5125-5140,2000.

Rochelle and Cullinane, "$K_2CO_3$/piperazine solutions for $CO_2$ removal from flue gas," *Separations Research Program Research Review*, Apr. 17, 2001.

Rochelle and Cullinane, "Piperazine promoted $K_2CO_3$ solutions for $CO_2$ capture from flue gas," *Separations Research Program Research Review*, Oct. 9, 2001.

Rochelle and Seibert, "Carbon dioxide capture by absorption with potassium carbonate," *Proposal to the Department of Energy*, submitted Jul. 23, 2001, granted on Dec. 9, 2002.

Rochelle et al., "Research results for $CO_2$ capture from flue gas by aqueous absorption/stripping," *Laurence Reid Gas Conditioning Conference*, Feb. 25-27, 2002.

Tosh et al., "Equilibrium study of the system potassium carbonate, potassium bicarbonate, carbon dioxide, and water," *USBM RI*, 5484, 1959.

Tseng et al., "Carbon dioxide absorption into promoted carbonate solutions," *AIChE. J.*, 34:922-931, 1988.

Office Action, issued in Russian Application No. 2005134238, dated Dec. 11, 2008.

Short Chemical Encyclopedia, Moscow, Soviet Encyclopedia, vol. 5, pp. 1034, 1035.

Sarotri and Savage, "Sterically hindered amines for $CO_2$ removal from gases," *Ind. Eng. Chem. Fundam.*, 22:234-349, 1983.

Japanese Office Action, issued in Application No. 2006-509553, mailed Mar. 12, 2010 (English Translation).

* cited by examiner

POLYAMINE/ALKALI SALT BLENDS FOR CARBON DIOXIDE REMOVAL FROM GAS STREAMS

This application is a national phase application under 35 U.S.C. §371 of International Application No. PCT/US2004/009962, filed Apr. 1, 2004, which claims priority to U.S. Provisional Application No. 60/460,532 filed Apr. 4, 2003. The entire text of each of the above-referenced disclosures is specifically incorporated herein by reference without disclaimer.

The present invention relates generally to the field of gas purification. More particularly, it provides a variety of compositions and methods for use in removing $CO_2$ from gaseous streams.

BACKGROUND OF THE INVENTION

The effects of $CO_2$ emissions on global climate are driving a need to develop cost-effective technology for $CO_2$ capture from fossil fuel combustion and other point sources. Extensive programs already in place are beginning to demonstrate the economic and technical feasibility of sequestering $CO_2$ by approaches such as injection in underground reservoirs (Bergman, P. D., E. M. Winter, and Z-Y. Chen, "Disposal of Power Plant $CO_2$ in Depleted Oil and Gas Reservoirs in Texas," presented at the Third International Conference on Carbon Dioxide Removal, Cambridge, Mass., Sep. 9-11, 1996) and disposal in the deep ocean (Fujioka, Y. et al., "Cost Comparison of Various $CO_2$ Ocean Disposal Options," presented at the Third International Conference on Carbon Dioxide Removal, Cambridge, Mass., Sep. 9-11, 1996).

$CO_2$ is emitted in large quantities from fuel combustion by mobile and stationary sources. $CO_2$ capture/sequestration will be most effective if applied to large stationary sources. The largest single sources of $CO_2$ are conventional coal-fired power plants that represent 30 to 40% of the $CO_2$ emissions in the U.S. Technology developed for such sources should also be applicable to $CO_2$ capture from gas and oil fired boilers, combined cycle power plants, coal gasification, and hydrogen plants. Absorption/stripping is suitable for both existing and new boilers. Specifically, it can be used with existing coal-fired boilers, especially if they already have scrubbers for $SO_2$— abatement. However, this process can be expensive, potentially increasing the cost of electricity by 50%; therefore, technology improvements to reduce operating costs are desirable.

The use of organic solvents or aqueous solutions of organic solvents for the absorption/stripping process is well known. Alkanolamine absorption/stripping is one proven and effective technology for $CO_2$ capture from gas. The first generation of this technology uses aqueous solutions of monoethanolamine (MEA). The energy consumption of this system is high, typically taking 15 to 30% of the power plant output (Herzog, H., E. Drake, & E. Adams, "$CO_2$ Capture, Reuse, and Storage Technologies for Mitigating Global Climate Change," final rept, DOE Order No. DE-AF22-96PC01257, 1997). Advances in this technology have provided other alkanolamine solvents for $CO_2$ treating in various industries. Monoethanolamine (MEA), diethanolamine (DEA), and the hindered amine AMP are used alone in an aqueous solution. Typical solvent blends include a methyldiethanolamine (MDEA) solution promoted by piperazine or other secondary amines.

Potassium carbonate and other solvents are commonly promoted by DEA or other reactive amines. These amines are provided in catalytic amounts and are used to improve the absorption characteristics of the solvent. Patents describing these solvents and processes include U.S. Pat Nos. 4,094,957, 4,112,050, 4,217,237, 4,336,233, 4,581,209, 5,853,680, 6,036,931, 6,337,059 and 6,416,568

U.S. Pat. No. 4,336,233, which provides a solvent system combining MDEA and piperazine as an absorption accelerator, recognized that piperazine could be used alone in an aqueous system. Similarly, U.S. Pat. No. 6,337,059 provides a solvent system with greater than 1 M piperazine and MDEA where greater concentrations of piperazine improves the absorption performance of the solvent. However, piperazine concentration of greater than about 1.3 M are not usable because the piperazine precipitates out of the solution. Additionally, piperazine is highly volatile, limiting the practicality of this solvent.

U.S. Pat. No. 6,436,174 provides a solvent system in which certain concentrations of a nitrogen heterocycle such as piperazine can be used in combination with a monohydric or polyhydric alcohol. That disclosure finds that the solubility of the nitrogen heterocycle in the presence of a monohydric or polyhydric alcohol is generally markedly higher than the solubility of the nitrogen heterocycle alone. U.S. Pat. No. 6,436,174 does not, however, teach that a solvent system with a high concentration of an alkali salt will increase the solubility of a polyamine and does not provide suitable ranges of solvent components that would be effective to create a solvent that can efficiently remove $CO_2$ from a gas stream.

It would be advantageous to provide an organic solvent for removal of $CO_2$ from gas streams having faster reaction rates, acceptable volatility, and a low heat of absorption that will allow a reduction in cost for the absorption/stripping process. It would also be advantageous to provide a solvent that more closely approaches reversible absorption and stripping, which will particularly benefit operations with high $CO_2$ concentrations.

Embodiments of the present invention contemplate a method of removing $CO_2$ from a gaseous stream including: contacting a gaseous stream with a solution wherein the solution is formed by combining: a primary or secondary polyamine having an amine concentration of at least 3.0 equivalents/Kg water, an alkali salt having a concentration of at least 1.0 equivalents/Kg water, and water; whereby the contact removes $CO_2$ from the gaseous stream; and regenerating the solution.

In another embodiment, a composition is provided wherein the composition is formed by combining: a piperazine derivative having a concentration of at least 3.0 equivalents/Kg water; and a potassium salt having a concentration of at least 1.0 equivalents/Kg water, water, wherein the ratio of equivalents of alkali salt to equivalents of the piperazine derivative is 0.3-3.0. The piperazine derivative may be piperazine. The potassium salt may be a potassium alkali salt such as potassium carbonate, potassium bicarbonate, potassium bisulfide, or potassium hydroxide. The ratio of equivalents of alkali salt to equivalents of piperazine derivative may be 0.5-2.0, 0.8-1.3, or 0.9-1.1. The concentrations of the piperazine derivative and alkali salt are preferably between 3.0 and 8.0 equivalents/Kg $H_2O$, or between 4.0 and 6.0 equivalents/Kg $H_2O$. In one embodiment, the concentration of the piperazine derivative is approximately 5.0 equivalents/Kg $H_2O$ and the concentration of the alkali salt is approximately 5.0 equivalents/Kg $H_2O$. The composition may further include an antioxidant, a corrosion inhibitor, a flocculation aid, or a mixture thereof.

Yet another embodiment of the current invention includes a method of removing $CO_2$ from a gaseous stream including: contacting a gaseous stream with a solution wherein the solution is formed by combining: a primary or secondary polyamine having an amine concentration of at least 5.1 equivalents/Kg water, an alkali salt having a concentration of at least 5.1 equivalents/Kg water, and water; whereby the contact removes $CO_2$ from the gaseous stream; and regenerating the solution. The concentration of the polyamine and the concentration of the alkali salt are may be least 3.0, 3.5, 4.0, 4.5, 5.0, 5.5, 6.0, 6.5, 7.0, 7.5, or 8.0 equivalents/Kg water. Preferably, the concentrations are at least 5.5, 6.0, or 6.5 equivalents/Kg water. The concentration of the polyamine and the concentration of the alkali salt are preferably approximately equal; the concentrations may be approximately 5.1, 5.5, 6.0, 6.5, 7.0, 7.5, 8 or more equivalents/Kg $H_2O$ for both the polyamine and alkali salt. The concentrations will be limited by the solubility of the components at the temperature.

Another embodiment of the current invention includes a method of removing $CO_2$ from a gaseous stream including: contacting a gaseous stream with a solution wherein the solution is formed by combining: a primary or secondary polyamine having an amine concentration of at least 3.0 equivalents/Kg water, an alkali salt having a concentration of at least 1.0 equivalents/Kg water, and water; wherein the solution contains less than 1% of a monohydric or polyhydric alcohol; whereby the contact removes $CO_2$ from the gaseous stream; and regenerating the solution. In one embodiment, less than 1 percent by weight alcohol is added to the solution. In another embodiment, no alcohol is added.

Another embodiment of the current invention includes a method of removing $CO_2$ from a gaseous stream including: contacting a gaseous stream with a solution wherein the solution is formed by combining: a piperazine derivative having an amine concentration of 3.0-10.0 equivalents/Kg water, an alkali salt having a concentration of 1.0-10.0 equivalents/Kg water, and water; wherein the concentration of the piperazine derivative and the concentration of the alkali salt are approximately equal; whereby the contact removes $CO_2$ from the gaseous stream; and regenerating the solution. Preferably, the amine concentration and the alkali salt concentrations are between 3.0-8.0 equivalents/Kg water.

The polyamine may be a piperazine derivative such as piperazine, aminoethylpiperazine, hydroxyethylpiperazine, 3-(3-pyrrolidyl)piperidine, 2-(3-pyrrolidyl)piperazine, 3-(3-piperidyl)-piperidine, 3-(2-piperazinyl)piperidine, or 2-(2-piperazinyl)piperazine. The polyamine may be ethylenediamine, dimethyl ethylenediamine, pyrazolidine, imidazolidine, 2-(2-pyrrolidyl)-pyrrolidine, 2-(2-imidazolidyl)imidazolidine. Preferably, the amine moieties of the polyamine are not sterically hindered; preferably, at least one amine is not sterically hindered, or at least two amines are not sterically hindered, or three or more amines moieties on the polyamine are not sterically hindered, no amines located on the polyamine are sterically hindered. The alkali salt may be potassium carbonate, a sodium carbonate, a lithium carbonate, a bicarbonate salt, a bisulfide salt, or a hydroxide salt.

The temperature of the solution when contacting with the gaseous stream may be between approximately 25° C.-120° C. or more preferably approximately 40° C.-80° C. The rate constant for the reaction of $CO_2$ with the piperazine derivative ($K_{PZ}$) may be at least 25 m³/mol-s at 25° C., or at least 50 m³/mol-s at 25° C.

The regenerating may include heating $CO_2$-rich solution, which may occur at a temperature of approximately 50° C.-150° C., approximately 60° C.-130° C., or approximately 100° C.-130° C. An additive such as an antifoaming agent, an antioxidant, a corrosion inhibitor (e.g. vanadium oxide or a chromate), a flocculation aid, or a mixture of two or more additives may be included as part of the solution.

The ratio of equivalents of alkali salt to equivalents of polyamine is preferably between 0.3-3.0, 0.5-2.0, 0.8-1.3, or most preferably between 0.9-1.1. The concentrations of the polyamine and alkali salt are preferably between 3.0 and 8.0 equivalents/Kg $H_2O$ or 4.0 and 6.0 equivalents/Kg $H_2O$. The polyamine concentration and the alkali salt concentration may be at least 2.3 m. In one embodiment, the concentration of the polyamine is approximately 5.0 equivalents/Kg $H_2O$ and the concentration of the alkali salt is approximately 5.0 equivalents/Kg $H_2O$.

In another embodiment, the method of removing $CO_2$ from a gaseous stream may further include applying a water wash system, wherein the water wash system collects the polyamine from treated gaseous stream. The regeneration of the solution may occur in a vacuum stripper column, and the solution may be returned to contact with the gaseous stream after regeneration.

In one embodiment, the rate for the solvent-mediated removal of $CO_2$ from the gaseous stream is at least 1.5 times the rate for $CO_2$ removal in a method using an aqueous solution of 5.0-M monoethanolamine.

Other components of a gaseous stream, such as $H_2S$ or COS may also be removed by the method of the current invention. The gaseous stream may be from a coal-fired power plant, or it may be flue gas, natural gas, hydrogen gas, synthesis gas or a waste gas stream.

The following drawings form part of the present specification and are included to further demonstrate certain aspects of the present invention. The invention may be better understood by reference to one or more of these drawings in combination with the detailed description of specific embodiments presented herein.

FIG. 1 Comparison of $CO_2$ absorption rates in amine solvents at 60° C. over a range of $CO_2$ vapor pressures.

Figure 2:
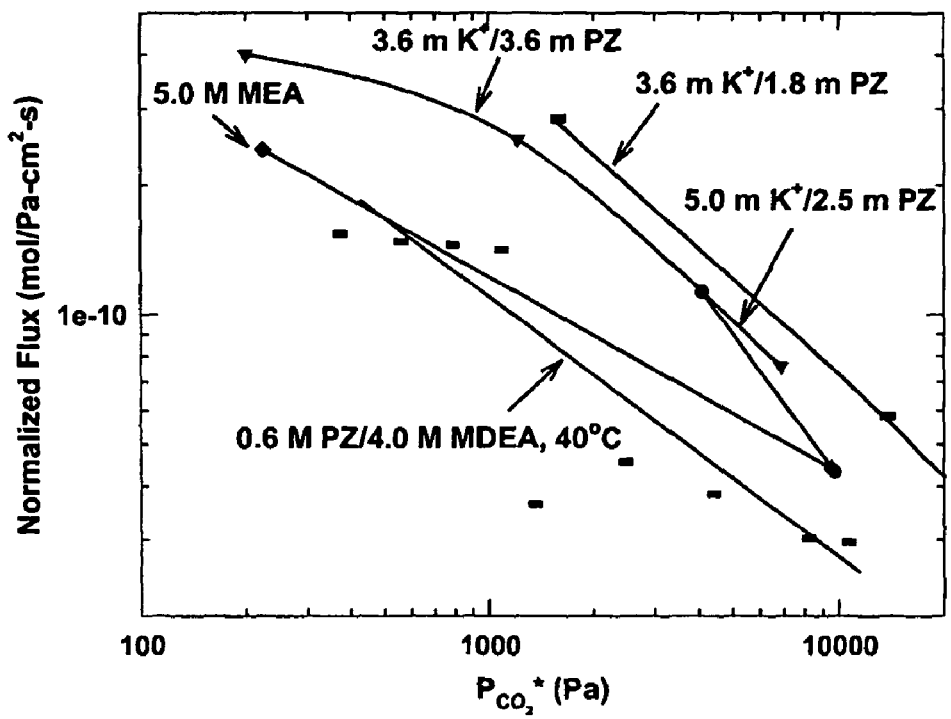

FIG. 2 A comparison of the rate of absorption for the piperazine solvent of the current invention and other amine solvents.

Figure 3:
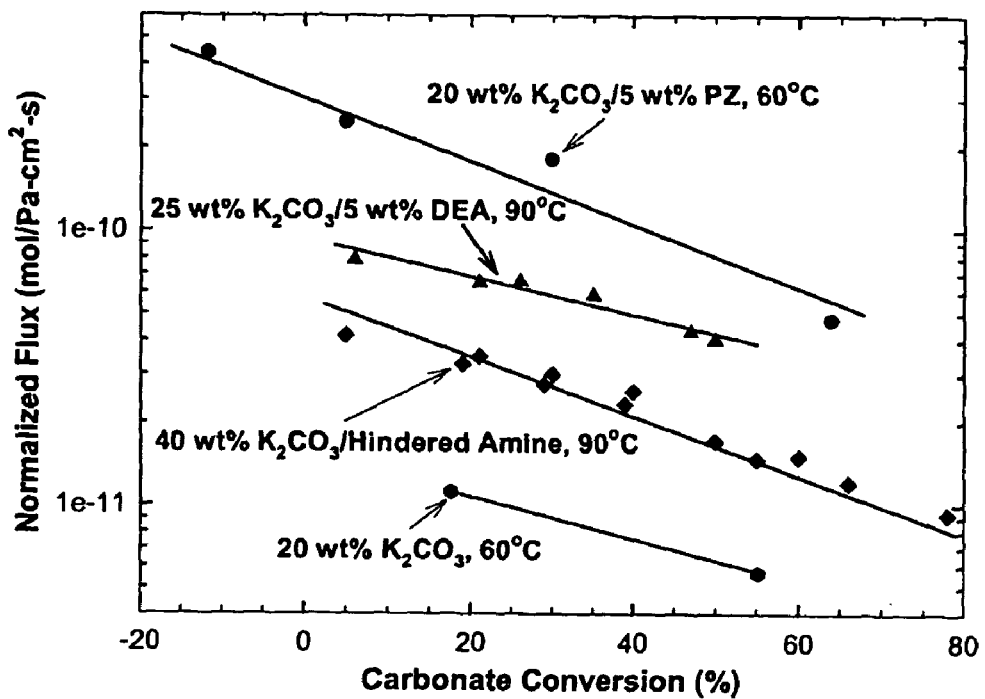

FIG. 3 A comparison of the $CO_2$ absorption rate for the piperazine solvent of the current invention and other solvents with promoted potassium carbonate.

Figure 4:
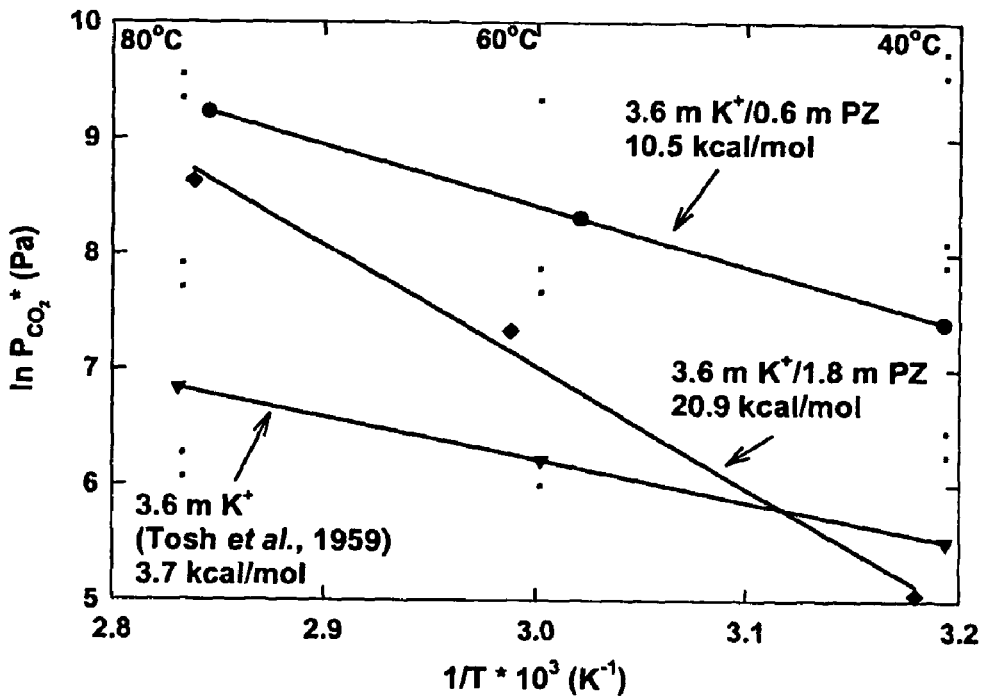

FIG. 4 Heat of absorption for solvents having various concentrations of $K^+$ and PZ.

Figure 5:
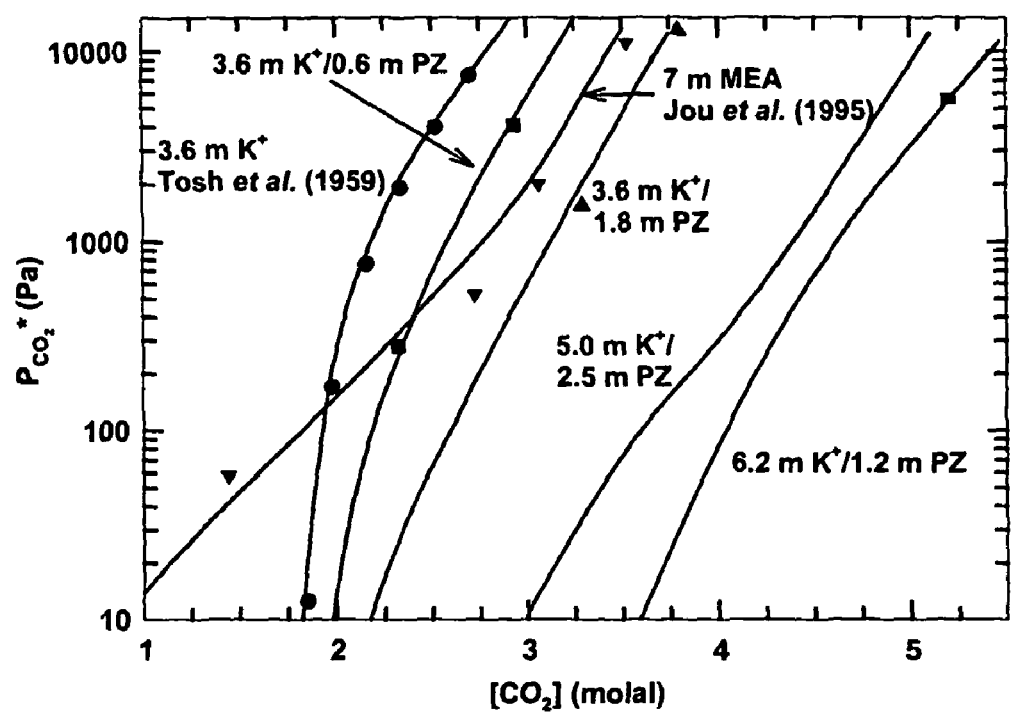

FIG. 5 Capacity of the $K^+$/PZ solvents in the operating range of 300 to 8000 Pa compared with the capacity of MEA.

Embodiments of the present invention include a novel solvent and method of use for the removal of $CO_2$ from flue gas, natural gas, hydrogen gas, synthesis gas, and other process and waste gas streams. The solvent may contain an alkali salt such as potassium carbonate and a polyamine such as piperazine (PZ) with an alkali salt/polyamine ratio from approximately 0.5 to 2 or more preferably 1 to 2, with the total concentration limited by the solid solubility of the polyamine or of the alkali salt, and will be at least 3.0 equivalents/Kg $H_2O$ PZ. No additional alcohols are required for increasing solubility of the PZ. This chemical solvent is designed to increase the rate of $CO_2$ removal to improve the efficiency of the removal process.

As used herein, the term "synthesis gas" refers to gases comprising both hydrogen gas and carbon monoxide gas. The mole ratio of hydrogen to carbon monoxide may, but need not necessarily, be about one to one. Other inter materials such as nitrogen, carbon dioxide, hydrogen sulfide and COS and often found in synthesis gas.

As used herein the specification, "a" or "an" may mean one or more. As used herein in the claim(s), when used in conjunction with the word "comprising", the words "a" or "an" means one or more than one unless explicitly stated otherwise.

As used herein "another" may mean at least a second or more. As used herein the terms "approximately" and "about" both mean within 20% of the stated value or more particularly within 10% of the stated value.

A variety of alkali salts may be used in forming the solvent of the current invention. Alkali metals including but not limited to potassium, sodium and lithium may be used. They may be formed in any one of a variety of salts. These salts include, but are not limited to carbonate, bicarbonate, hydroxide, and bisulfide salts. One preferred salt is potassium carbonate. Other alkali salts include, potassium bicarbonate, potassium hydroxide, and potassium bisulfide. Similarly, the lithium and sodium salts may be used, such as sodium carbonate and lithium carbonate.

Alternatively, a mixture of two or more salts may be used in place of a single alkali salt in the solvent. For example, potassium carbonate may be combined with sodium carbonate in a ratio of 1/10, 1/5, 3/10, 2/5, 1/1, 3/5, 7/10, 4/5, 9/10, 10/9, 5/4, 10/7, 5/3, 5/2, 5/1, 10/1 or any ratio therebetween. If a mixture of salts is used, the preferred concentration ratio of salt to polyamine is based on the total alkali salt concentration.

One advantage of a potassium carbonate solvent is that, because potassium sulfate and chloride may be useful as fertilizer, it will be easier to dispense of spent potassium carbonate solvent. Therefore, this solvent is more resistant to slippage of $SO_2$ and HCl from an existing flue gas desulfurization system.

A variety of cyclic or linear, primary or secondary polyamines may be used as one component of the solvent of the current invention. The polyamine may be a piperazine derivative such as piperazine, aminoethylpiperazine, and hydroxyethylpiperazine. Other examples of polyamines that can be used in the current invention include, but are not limited to, ethylenediamine, dimethyl ethylenediamine, piperazine, pyrazolidine, imidazolidine, 2-(2-pyrrolidyl)pyrrolidine, 2-(2-imidazolidyl)imidazolidine, 3-(3-pyrrolidyl)piperidine, 2-(3-pyrrolidyl)piperazine, 3-(3-piperidyl)piperidine, 3-(2-piperazinyl)piperidine, and 2-(2-piperazinyl)piperazine.

It is preferred, though not required, that the amines of the current invention are not sterically hindered. One advantage of the current invention is a potentially high rate of reaction of $CO_2$ with the solvent. If one or more of the amine function on the polyamine are sterically hindered by substituent groups, the rate of $CO_2$ reaction and absorption may be significantly reduced.

A mixture of two or more polyamines may be used in place of a single polyamine compound in the solvent. For example, piperazine may be combined with aminoethylpiperazine or another polyamine in a ratio of 1/20, 1/10, 1/5, 3/10, 2/5, 1/1, 3/5, 7/10, 4/5, 9/10, 10/9, 5/4, 10/7, 5/3, 5/2, 5/1, 10/1, 20/1 or any ratio therebetween. If a mixture of polyamines is used, the preferred concentration ratio of salt to polyamine is based on the total concentration of the amine groups.

The polyamines described herein can be purchased from a variety of commercial sources as is known in the art or synthesized through standard chemical techniques known in the art. Piperazine can be obtained, for example, by reacting monoethanolamine with ammonia, or by reacting ethylene oxide and $NH_3$ and then cyclizing the ethanolamine byproduct.

Embodiments of the current invention provide using at least 3.0 equivalents/Kg $H_2O$ for the polyamine and at least 0.5 equivalents/Kg $H_2O$ for the alkali salt. In a preferred embodiment, the solvent will have either a substantially equal blend of the two components or a blend having up to a 2-to-1 ratio of the alkali salt to the polyamine. In a more preferred embodiment, the solvent will have a substantially equal blend of the two components at a concentration of at least 3.0 equivalents/Kg $H_2O$. This can be distinguished from other systems that use "promoters," which are smaller, catalytic amounts of amines, designed to improve absorption characteristics in a concentrated solution containing a less reactive amine or potassium carbonate. Examples of promoter technology is provided in U.S. Pat. No. 4,336,233 to BASF, which proposes 0.05 to 0.8-M aqueous PZ or more preferably 0.05 to 0.4 M PZ as a promoter in a solvent containing MDEA.

The amount of alkali salt and polyamine in the solution is limited by the solubility of both components. Both pure potassium carbonate and pure piperazine are solids, resulting in solid solubility limits for aqueous solutions. At 25° C. the solubility of potassium in a $CO_2$ rich solution is 3.6 m and the solubility of PZ in water is approximately 2 m. With a solid solubility limitation, the resulting lower concentrations can result in slow reaction rates and low solution capacity making the solvent unattractive. By combining PZ and potassium carbonate in an aqueous solution the solid solubility is increased to as much as 3.6 m PZ, allowing a greater total concentration of solute and potentially increasing the absorption rate and capacity. At higher temperatures, the solubility increases even more and allows for more concentrated solutions to be used. It has been suggested that PZ concentrations greater than 1.3 m can not be used in a $CO_2$-rich environment (in the absence of an alkali salt) due to the formation of piperazine carbamate that precipitates from the solution. (U.S. Pat. No. 4,336,233). However, greater concentrations of alkali salts and polyamines are feasible without precipitation of solids. Greater reagent concentrations increase the capacity of the solvent and reduce remaining energy requirements associated with the sensible heat of the solvent. Greater polyamine concentration also enhance $CO_2$ absorption rates.

The concentration of $K_2CO_3$ solvent without PZ is limited by the precipitation of $KHCO_3$. Available data suggests that rich solution with a $CO_2$ partial pressure of 0.1 atm will be limited to 30 wt % $K_2CO_3$ at 40° C. and 35 wt % at 60° C. (Bocard, J. P., and B. J. Mayland, "New Charts for Hot Carbonate Process," Hydroc. Proc. & Pet. Ref., 41(4), 128, 1962; Tosh, J. S. et al., "Equilibrium Study of the system potassium carbonate, potassium bicarbonate, carbon dioxide, and water," USBM RI 5484, 1959). It is understood that operation near the solubility limit may require careful process control.

Below 40° C., the stable PZ solid is $PZ.6H_2O$, with a solubility of 1.8 M PZ at 25° C. Above 40° C., the stable phase is anhydrous PZ with a solubility of 7.4 M at 40° C. It is possible that high salt concentrations, such as $K^+$ $CO_3^-$/$HCO_3^-$, will reduce the solubility of the free PZ as much as a factor of 2. But less than 25% of the total PZ will be present as free PZ in the lean solvent. Therefore, even if the precipitation of $PZ.6H_2O$ below 40° C. limits the solvent composition, concentrations of up to 3 M PZ can be used. An aqueous solution that contains only PZ could be used as a scrubbing solvent, however, it would have limited applicability since, at concentrations above about 1.3 M, piperazine precipitates in the presence of $CO_2$ as the carbamate. The solubility of piperazine in water at 20° C. is only 1.5 M. U.S. Pat. No. 4,336,233.

It is therefore advantageous to combine a polyamine and an alkali salt at relatively high concentrations. A polyamine will have a concentration of at least 1.5 m, or 3.0 equivalents for a diamine per Kg water, and the alkali salt will have a concentration of at least 0.5 m or 1.0 equivalents for a divalent salt per Kg water. In a preferred embodiment the ratio of the polyamine to the alkali will be approximately 1 to 1, for example 3.6 equivalents PZ/Kg water and 3.6 equivalents potassium/Kg water. Similarly, both components may have concentrations of 1.5 equivalents/Kg water ore both components may have concentrations of 5.0 equivalents/Kg water. This one-to-one ratio of alkali salt to amine moiety provides for effect solubility of both components and solvation of $CO_2$. Other 1:1 ratios of alkali salt to amine moiety include but are not limited to 2:2, 2.5:2.5, 3:3, 3.5:3.5, 4:4, 4.5:4.5, 5.5:5.5, 6:6, 6.5:6.5, 7:7, 7.5:7.5, 8:8, 8.5:8.5, 9:9 equivalents/Kg water. Other concentration ratios may also be used; for example, an excess of salt for a solvent having 3.0 equivalents/Kg water potassium carbonante and 1.5 equivalents/Kg water PZ may be used. Concentration ratios contemplated in the current invention include but are not limited to salt/amine equivalents ratios of approximately: 3:1, 2.9:1, 2.8:1, 2.7:1, 2.6:1, 2.5:1, 2.4:1, 2.3:1, 2.2:1, 2.1:1, 2:1, 1.9:1, 1.5:1, 1.7:1, 1.6:1, 1.5:1, 1.4:1, 1.3:1, 1.2:1, 1.1:1, 1:1, 1:1.1, 1:1.2, 1:1.3, 1:1.4, 1:1.5, 1:1.6, 1:1.7, 1:1.5, 1:1.9, 1:2, 1:2.1, 1:2.2, 1:2.3, 1:2.4, 1:2.5, 1:2.6, 1:2.7, 1:2.8, 1:2.9, and 1:3. Other ranges considered include 4:1, 3.9:1, 3.8:1, 3.7:1, 3.6:1, 3.5:1, 3.4:1, 3.3:1, 3.2:1, 3.1:1, 1:3.1, 1:3.2, 1:3.3; 1:3.4; 1:3.5; 1:3.6, 1:3.7, 1:3.8, 1:3.9, and 1:4.

In the absence of a polyamine, $CO_2$ reacts with carbonate to give bicarbonate. The heat of this reaction is about 5 kcal/gmol:

$$CO_2(g) + CO_3^= + H_2O \rightarrow 2HCO_3^-$$

By combining a polyamine such as piperazine and carbon dioxide, the piperazine undergoes equilibrium reactions as shown in the following reactions.

$$PZ + CO_2 + H_2O \leftrightarrows PZCOO^- + H_3O^+$$

$$PZCOO^- + C_2 + H_2O \leftrightarrows PZ(COO^-)_2 + H_3O^+$$

In this reaction, PZ ($C_4N_2H_{10}$), reacts with $CO_2$ to make PZ-carbamate CPZCOO$^-$) and PZ-dicarbamate (PZ(COO$^-$)$_2$). In the limit of reaction, the stoichiometry would be:

$$CO_3^{2-} + 2.PZCOO^- + CO_2 \leftrightarrows 2.PZ(COO^-)_2$$

Free piperazine is not shown to be present to contribute to volatility in this reaction. However, free piperazine will be present in the solution, but is in lesser amounts as $CO_2$ or $CO_3^{2-}$ is added to the solution. The addition of potassium carbonate would both add $CO_3^{2-}$ to the solution and provide a dissociated cation to combine with anionic piperazine species.

Carbonate will buffer to give the overall reactions:

$$CO_2(g) + CO_3^{2-} + PZ \rightarrow PZCOO^- + HCO_3^-$$

$$CO_2(g) + {}^+CO_3^{2-} + PZ-COO^- \rightarrow PZ(COO^-)_2 + HCO_3^-$$

In solutions with large concentrations of PZ where these reactions dominate, the heat of absorption of $CO_2$ will be as much as 20 kcal/gmol. Therefore the expected heat of absorption in solvents containing both the alkali salt $K_2CO_3$ and the polyamine PZ will vary from about 10 to 20 kcal/gmol, depending on the concentration of PZ. An advantage of the solvent system containing a polyamine and an alkali salt is the ability to tune the heat of absorption by changing the salt/polyamine ratio. For comparison, the heat of absorption of $CO_2$ in MEA solvents is about 22 kcal/gmol.

Although the reactions above are specific for PZ, other polyamines will react similarly, with each amine group reacting with $CO_2$ to make carbamate, dicarbamate, tricarbamate, etc.

The effect of the innovative solvent on $CO_2$ absorption rates at 60° C. is shown in FIG. 1. Solvents with $K^+$/PZ ratios of one to two give absorption rates that are 1.5 to 5 times faster than other common solvents (5.0 M MEA) and other solvents promoted with less piperazine.

While the piperazine reaction mechanism is typical of other amines, the presence of potassium carbonate in the solution significantly enhances the reaction rates as is shown by the value of the specific rate constants in Table 1. The rate expression for the calculations in Table 1 is given by:

$$r = (k_{PZ-OH}[PZ][OH^-] + k_{PZ}[PZ] + k_{PZCOO^-}[PZCOO^-])[CO_2].$$

Also evident is apparent accelerated rate behavior in the presence of a base such as hydroxide or carbonate. Both characteristics are advantageous because faster absorption rates will result in less energy requirements and/or capital cost can be reduced. The rate of absorption could be increased by a factor of three over other amine solvents.

TABLE 1

Specific Rate Constants for the Piperazine-$CO_2$ Reaction With and Without Potassium Present

|  | $k_{PZ-OH}$ ($m_6$/mol$^2$ – s) | $k_{PZ}$ (m$^3$/mol – s) | $k_{PZ}COO^-$ (m$^3$/mol – s) |
| --- | --- | --- | --- |
| Without K$^+$ | 0.0 | 54 | 47 |
| With K$^+$ | 2.6 | 290 | 47 |

*$k_{MEA}$ = 7 m$^3$/mol – s

Because of the increased rates of absorption in the current invention compared to methods known in the art, several cost optimization options are available for use with the present invention. First, the faster rates allow operating at a closer approach to equilibrium. This has the potential to reduce energy requirements by a factor of three. Second, the tower height can be reduced, lowering the required amount of packing in a column. This also reduces the pressure drop through the column and, consequently, reduces energy costs. Finally, some optimum combination of the previous two cases may be considered to reduce both capital and operating costs.

Even with the formation of ionic species in the solvent, there will still be some free piperazine. The volatility will be a concern if not addressed. This problem can be reduced or eliminated by the use of a water wash system. Most amine processes already contain water wash trays to collect amines from treated gas in the absorber and stripper.

The degradation of piperazine in solution is also believed to be significant. It is expected that carbamate polymerization, one mechanism for degradation, will occur at slower rates than in MEA and other amine solvents. The potential of oxidative degradation is also present and may or may not be slower than MEA.

The current art for $CO_2$ capture from flue gas is absorption/stripping with 15 to 30 wt % aqueous MEA. 90 to 99% of the $CO_2$ is removed in an absorber with 40 to 60 feet of dumped packing at atmospheric pressure. The pressure drop and capital cost of the absorber are large and could be significantly reduced by the enhanced $CO_2$ absorption rate. The temperature for the absorption process should be between 25° C. and 120° C., or more preferentially between 40° C. and 80° C.

Absorption/stripping processes known in the art, such as those provided by Exxon and UOP, provide technologies with isothermal absorption/stripping at 90 to 120° C. The stripper typically operates slightly above atmospheric pressure. These systems utilize isothermal, pressure swing regeneration rather than thermal swing because the heat of desorption of $CO_2$ (5 kcal/mol) is less than the heat of vaporization of water (10 kcal/mol). Greater temperature in the stripper does not increase the volatility of $CO_2$ relative to that of water. The solvent in these systems is regenerated in a stripper with 40 to 60 feet of packing near atmospheric pressure at 110 to 130° C. The demand for moderate level heat (30-60 psi steam) to drive the reboiler is large, approaching 20 to 30% of the thermal requirement for the power plant.

Generally, the $CO_2$ removal process consists of an absorber column in which a $CO_2$-rich gas stream contacts a circulated chemical solvent between approximately 40 and 100° C. The solvent, after absorbing $CO_2$, is passed to a stripper column where the $CO_2$ in solution is removed by heating to approximately 50 to 150° C., or more preferentially between 60° C. and 130° C., and most preferentially between 100° C. and 130° C. The solvent is then returned to the absorber as a $CO_2$-lean solution.

The combination of potassium carbonate and piperazine as a solvent for this process yields flexibility and advantages over current state-of-the-art solvents. $K^+$/PZ blends are effective for getting good rates of $CO_2$ absorption; the rates can be two to three times faster than 5.0 M MEA. The blend also improves solid solubility of both components and may reduce the volatility of piperazine.

Various methods of stripping may be used, including stripping with vapor recompression, stripping with turbine exhaust steam, and multi-stage stripping. In one embodiment, $CO_2$ capture from flue gas using the solvent of this invention uses isothermal operation with a vacuum stripper. The low pressure of the absorber (1 atm) will not permit operation at temperature greater than 50 or 60° C. without requiring additional heat to evaporate large quantities of water. The solvent will effectively catalyze the absorption and desorption of $CO_2$ at this lower temperature.

The absorption and stripping can be carried out at atmospheric or superatmospheric pressures. The stripper pressure can be adjusted to minimize the energy requirement of the system, and can be determined through modeling. This modeling will also optimize the amount of packing in the absorber and stripper. As the temperature and pressure of the stripper are reduced, the rate of reaction to produce $CO_2$ will also decrease and the mass transfer capability of the stripper will be reduced.

The process may also involve a one-step or a two-step washing step to collect the polyamine. The wash may be a water wash and can occur at the absorber column or at the stripper column.

$CO_2$ absorption and desorption in the alkali salt and polyamine solvents is determined primarily by diffusion of $CO_2$ in the liquid film with fast reaction near the gas liquid interface. The rate is mostly independent of the gas and liquid film mass transfer coefficients and depends on the gas liquid contact area. The flux depends on the square root of kinetics of the reaction, in this case, with the species PZ and $PZCOO^-$.

The rate constants $k_{PZ}$ and $k_{PZCOO^-}$ have been determined from measurements in water and in 50% MDEA. These values are 5 to 10 times faster than the comparable rate constant for MEA. Doubling the concentration of PZ species increases the rates of $CO_2$ absorption by approximately 40%. The effective gas film mass transfer coefficient is a strong function of loading and decreases a factor of 4 from lean (0.003 atm) to rich (0.06 atm) conditions.

With low $CO_2$ concentration and high free amine concentration, the rate of $CO_2$ absorption will be controlled solely by the gas/liquid contact area. At greater $CO_2$ concentration and reduced free amine concentration, the $CO_2$ absorption will be controlled to a greater extent by liquid film diffusion of the polyamine.

Additional measurements of $CO_2$ absorption/desorption can be made in a wetted wall column with the alkali salt and polyamine solvents over a wider range of conditions. The apparatus is described by Mshewa, M. M. "$CO_2$ Desorption/Absorption with Aqueous Mixtures of MDEA and DEA at 40 to 120° C.," Ph.D. Dissertation, 1995; Pacheco, M. and G. T. Rochelle, "Rate-based Modeling of Reactive Absorption of $CO_2$ and H2S into Aqueous Methyldiethanolamine," Ind. Eng. Chem. Res., 37(10), 4107-4117, 1998; Pacheco, M., "Mass Transfer, Kinetics and Rate-based Modeling of Reactive Absorption," Ph.D. Dissertation, May 1998; Pacheco, M., S. Kaganoi, and G. T. Rochelle, "$CO_2$ Absorption into Aqueous Mixtures of Diglycolamine and Methyldiethanolamine," Submitted to Chem. Eng. Sci., Jul. 5, 1999; Bishnoi, S. and G. T. Rochelle, "Absorption of Carbon Dioxide into Aqueous Piperazine: Reaction Kinetics, Mass Transfer and Solubility," presented at the 49th Annual CSChE Conference, Saskatoon, Saskatchewan, Oct. 3-6, 1999; and Bishnoi, Sanjay. "Carbon Dioxide Absorption and Solution Equilibrium in Piperazine Activated Methyldiethanolamine." Doctor of Philosophy Dissertation, The University of Texas at Austin, 2000. This system has been used for measurements of PZ/MDEA (Bishnoi, Sanjay. "Carbon Dioxide Absorption and Solution Equilibrium in Piperazine Activated Methyldiethanolamine." Doctor of Philosophy Dissertation, The University of Texas at Austin, 2000) and PZ/MEA (Dang, Hongyi. "$CO_2$ Absorption Rate and Solubility in Monoethanolamine/Piperazine/Water." Master of Science Thesis, The University of Texas at Austin, 2001). The wetted wall column was constructed from a stainless steel tube with a well defined surface area (38.5 cm$^2$) and a characteristic liquid film mass transfer coefficient similar to that of a packed tower. Rate of absorption is determined from the gas phase material balance using the measured inlet and outlet gas concentration. Solubility is measured by bracketing equilibrium with both absorption and desorption measurements. The operating conditions can be varied from 25 to 120° C., 1 to 7 atm total pressure, and 0001 to 1 mole fraction $CO_2$.

The polyamine in the solvent will undergo some amount of oxidative degradation. For PZ, this process causes the formation of ethylenediamine, formate, glycolate, and other amine and organic acid fragments. To reduce the amount of oxidative degradation of the solvent, antioxidants may be added to the solvent system or a vacuum stripper may be used. Any antioxidant known in the art may be used in the current invention. Typical concentrations for antioxidants range from about 0.01 to 5% by weight.

Other additional agents may also be added to the solvent of the current invention. These agent may act, for example, as an antifoaming agent, a flocculation aid, or a corrosion inhibitor. Typical concentrations for these additives range from about 0.01 to 5% by weight. These agents are well known in the art and may include, for example, vanadium oxides (e.g. $V_2O_3$), chromates (e.g. $K_2Cr_2O_7$), arsenious anhydrides, selenious acid, tellurous acid, protides, and amino acids.

The volatility of the polyamine PZ in the solvent of the current invention is low because less than 20% of it will be free PZ in lean solution. This increases the safety of the solvent. Any environmental impact could be minimized by using a water wash in the top of the absorber.

Various methods for describing solution concentrations are used herein, including molarity (moles solute/liter solution, M), molality (moles solute/Kg solvent, m) weight percent, and equivalents/Kg $H_2O$. At low solution concentrations, molarity and molality will be substantially the same as will the equivalents/Kg $H_2O$ when the component has a single equivalent of the reactive component (e.g., a monoamine). 1.5 m $K_2CO_3$ is approximately 20 wt % $K_2CO_3$. For example, 1.8 m $K_2CO_3$ has 3.6 equivalents $K^+$/Kg $H_2O$ and 1.8 m of tri-functional amine, diethylenetriamine has 5.4 equivalents amine/Kg $H_2O$.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1

Solvent Blends

There are at least three characteristics that define the usefulness and the efficiency of a solvent blend: the rate of $CO_2$ absorption, the heat of $CO_2$ absorption, and the capacity. Table 2 provides a summary of these characteristics for several systems in comparison to the standard technology of 7 m MEA and highlights the advantages of this invention. Values reported stem from experimental data and model predictions from Bishnoi, Sanjay. "Carbon Dioxide Absorption and Solution Equilibrium in Piperazine Activated Methyldiethanolamine." Doctor of Philosophy Dissertation, The University of Texas at Austin, 2000 and J. T. Cullinane. "Carbon Dioxide Absorption in Aqueous Mixtures of Potassium Carbonate and Piperazine." M. S. Thesis, The University of Texas at Austin, May 2002.

TABLE 2

| Solvent | Rate[a] × $10^{10}$ (mol/Pa – $cm^2$ – s) | $-\Delta H_{abs}$[b] (kcal/mol $CO_2$) | $\Delta$Loading[c] (mol $CO_2$/kg $H_2O$) | Volatility[d] (Pa) |
|---|---|---|---|---|
| 7 m MEA | 0.46 | 21.9 | 0.79 | 14.8 |
| 1.8 m PZ | 0.87 | 19.1 | 0.40 | 6.1 |
| 3.6 m $K^+$/0.6 m PZ | 0.38 | 9.5 | 0.48 | 0.4 |
| 5.0 m $K^+$/2.5 m PZ | 0.69 | 15.0 | 0.65 | 1.4 |

[a]Rate at $P_{CO2}$* = 3000 Pa and 40° C.
[b]Heat of $CO_2$ absorption at 80° C.
[c]Change in loading at 40° C. between $P_{CO2}$* of 300 and 3000 Pa
[d]Vapor pressure of liquid amine at 40° C., $P_{CO2}$* = 300 Pa, and activity coefficient of 1

Example 2

Rate of Absorption Advantages

The importance of a fast rate of absorption cannot be understated, as it is responsible for determining solvent rates and column height. Increasing the rate of $CO_2$ absorption allows a lower liquid flowrate, which reduces the energy required for operation of the process. Alternatively, the column height could be reduced, reducing the pressure drop across the column and the associated energy needs.

FIG. 1 shows a marked difference between solutions using catalytic amounts of piperazine and solutions using large amounts at 60° C. In a generalization of the effect of solvent composition on rate, a three- to six-fold increase in piperazine concentration results in a rate of absorption accelerated by a factor of two to three. Also, solvents with $K^+$/PZ ratios of one to two give rates substantially improved over solvents with ratios of three to six. In a specific demonstration of these effects, a 5.0 m $K^+$/2.5 m PZ solution absorbs $CO_2$ 2.5 times faster than a 3.6 m $K^+$/0.6 m PZ solution at 4000 Pa. The most effective solvents contain >1.5 m PZ and have a ratio of alkali salt/polyamine from 2 to 1.

A comparison of the rate of absorption of this invention and of other solvents known to those of skill in the art is shown in FIG. 2 and FIG. 3. At 60° C., concentrated solvents with a $K^+$/PZ ratio of one to two give absorption rates that are 1.2 to 5 times faster than 5.0 M MEA. Again comparing the preferred composition of the current invention to other solvents, the rate of absorption in 5.0 m $K^+$/2.5 m PZ is 1.4 times faster than absorption in 5.0 M MEA at 4000 Pa. Other concentration ratios produce a solvent with rates comparable to 5.0 M MEA. Similarly, the current invention outperforms (on a rate basis) PZ promoted MDEA at 40° C. Solvents containing $K^+$ and DEA or hindered amines have been shown to be less effective than even catalytic amounts of piperazine in potassium carbonate.

Example 3

Heat of Absorption Flexibility

An additional advantage of the current invention is demonstrated in FIG. 4. The heat of absorption, like the rate of absorption, depends on the piperazine concentration. A higher heat of absorption indicates more energy is needed to regenerate the solvent. A low heat of absorption is more favorable under ordinary operating conditions.

From FIG. 4, a variety of solvent compositions can be envisioned, each with different characteristics. At one extreme, the solvent can contain large concentrations of PZ and have fast rates and a high heat of absorption (~20 kcal/mol $CO_2$). Operation in this mode would result in a rate of absorption 1.5 to 5 times faster than 5.0 M MEA and a comparable heat of absorption. At the other extreme, the solvent can contain less PZ and have rates comparable to 5.0 M MEA, but a heat of absorption a factor of two less. This performance flexibility results in a solvent that can be "tuned" to specific operations and operating conditions.

Example 4

Capacity Comparisons

Capacity is the third important characteristic that defines the performance of a solvent. Defined as a change in loading over a given partial pressure change, capacity estimates the ability of a solvent to absorb $CO_2$ over a given operating range.

FIG. 5 shows that the capacity of $K^+$/PZ solvents in the operating range of interest ~300 to 8000 Pa is comparable to 5.0 M MEA. Model predictions, shown by the lines in FIG. 5, indicate that increased potassium concentrations will result in improved capacity. Specifically, the capacity of 5.0 m $K^+$/2.5 m PZ is 50% better than 3.6 m $K^+$/0.6 m PZ and is approaching the capacity of 7.0 m MEA. This demonstrates the advantage of the preferred solvent compositions containing >3.6 m $K^+$.

Example 5

Process Applications

An application of monoethanolamine (MEA) was calculated by Freguia (MS thesis, 2002). Flue gas is treated from a coal-fired power plant. The absorber is 7 m in diameter and uses 15 m of Cascade Mini Ring #2 (CMR#2) packing. The pressure drop in the absorber is 10 kPa. The simple reboiled stripper is 4.5 m in diameter with 10 m of CMR#2 packing and operates at 1.6 atm. The flue gas containing 12.6% $CO_2$ and 7.8% $H_2O$ is fed to the absorber at 55° C. with a rate of 11,000 kmol/hr. The solvent is 30 wt % MEA (7 gmol/kg $H_2O$) and is fed to the absorber at a 40° C. at a rate of 193 kg $H_2O$/s with a $CO_2$ loading of 0.21 mol/mol MEA. The rich loading is 0.46 gmol $CO_2$/gmol MEA with a $CO_2$ vapor pressure of 2.5 kPa. The solvent is preheated by cross-exchange to 109 C before being fed to the stripper. 90% of the $CO_2$ is removed (0.34 kmol/s) in the absorber with a reboiler duty of 70,000 kw.

The MEA solvent is replaced in the same system by a solvent containing 5 gmol $K^+$/kg $H_2O$ and 2.5 gmol piperazine/kg $H_2O$. Because $CO_2$ reacts more quickly with the solvent, the rich loading is 2 gmol $CO_2$/gmol piperazine with a $CO_2$ vapor pressure of 8 kPa. 90% of the $CO_2$ is removed in the absorber and the reboiler duty is reduced to 60,000 kw. The lean loading to the absorber is 1.3 gmol $CO_2$/gmol piperazine.

With a solvent containing 5 gmol $K^+$ and 2.5 gmol piperazine per kg $H_2O$, the height of packing in the absorber is reduced to 5 m. The pressure drop in the absorber is reduced to 3.3 kPa. Because the piperazine solvent absorbs $CO_2$ 3 times faster than MEA, 90% CO2 removal is achieved with a reboiler heat duty of 70,000 kw. The lean loading is 1.3 gmol $CO_2$/gmol piperazine. The rich loading is 1.85 gmol $CO_2$/gmol piperazine with a $CO_2$ vapor pressure of 2.5 kPa.

All of the methods disclosed and claimed herein can be made and executed without undue experimentation in light of the present disclosure. While the compositions and methods of this invention have been described in terms of preferred embodiments, it will be apparent to those of skill in the art that variations may be applied to the methods and in the steps or in the sequence of steps of the method described herein without departing from the concept, spirit and scope of the invention. More specifically, it will be apparent that certain agents that are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

The invention claimed is:

1. A method of removing CO2 from a gaseous stream comprising:
    contacting a gaseous stream with a solution, the solution being formed by combining at least:
    a primary or secondary polyamine having an amine concentration of at least 4.0 equivalents/Kg water, wherein the amines located on the polyamine are not sterically hindered,
    an alkali salt having a concentration of at least 1.0 equivalents/Kg water, and water;
    wherein no monohydric or polyhydric alcohol is added to the solution;
    whereby contacting removes CO2 from the gaseous stream;
    wherein the alkali salt concentration is selected to prevent precipitation of piperazine carbamate; and
    regenerating the solution.

2. The method of claim 1, wherein the polyamine is piperazine, aminoethylpiperazine, hydroxyethylpiperazine, ethylenediamine, or dimethyl ethylenediamine.

3. The method of claim 1, wherein the alkali salt is potassium carbonate, sodium carbonate, lithium carbonate, a bicarbonate salt, a bisulfide salt or a hydroxide salt.

4. The method of claim 1, wherein the gaseous stream is contacted with the solution at a temperature of approximately 25° C.-120° C.

5. The method of claim 1, wherein the rate constant for the reaction of $CO_2$ with the primary or secondary polyamine ($K_{PZ}$) is at least 25 $m^3$/mol-s at 25° C.

6. The method of claim 1, wherein the solution further comprises an additive.

7. The method of claim 1, wherein the polyamine concentration and the alkali salt concentration are at least 2.3 m.

8. The method of claim 1, wherein the ratio of equivalents of alkali salt to equivalents of polyamine is 0.3-3.0.

9. The method of claim 1, further comprising applying a water wash system, wherein the water wash system collects the polyamine from treated gaseous stream.

10. The method of claim 1, wherein the rate for the solvent-mediated removal of $CO_2$ from the gaseous stream is at least 1.5 times the rate for $CO_2$ removal in a method using an aqueous solution of 5.0-M monoethanolamine.

11. A method of removing CO2 from a gaseous stream comprising:
    contacting a gaseous stream with a solution, the solution being formed by combining at least:
    a primary or secondary polyamine having an amine concentration of at least 5.1 equivalents/Kg water, wherein the amines located on the polyamine are not sterically hindered,
    an alkali salt having a concentration of at least 5.1 equivalents/Kg water, and water;
    wherein no monohydric or polyhydric alcohol is added to the solution;
    whereby contacting removes CO2 from the gaseous stream;
    wherein the alkali salt concentration is selected to prevent precipitation of piperazine carbamate; and
    regenerating the solution.

12. The method of claim 11, wherein the concentration of the polyamine and the concentration of the alkali salt are at least 5.5 equivalents/Kg water.

13. The method of claim 11, wherein the concentration of the polyamine and the concentration of the alkali salt are approximately equal.

14. The method of claim 11, wherein the polyamine is piperazine, aminoethylpiperazine, hydroxyethylpiperazine, ethylenediamine, or dimethyl ethylenediamine.

15. The method of claim 11, wherein the alkali salt is potassium carbonate, sodium carbonate, lithium carbonate, a bicarbonate salt, a bisulfide salt or a hydroxide salt.

16. The method of claim 11, wherein the gaseous stream is contacted with the solution at a temperature of approximately 25° C.-120° C.

17. The method of claim 11, wherein the rate constant for the reaction of $CO_2$ with the primary or secondary polyamine ($K_{PZ}$) is at least 25 m³/mol-s at 25° C.

18. The method of claim 11, wherein the solution further comprises an additive.

19. The method of claim 11, wherein the rate for the solvent-mediated removal of $CO_2$ from the gaseous stream is at least 1.5 times the rate for $CO_2$ removal in a method using an aqueous solution of 5.0-M monoethanolamine.

20. A method of removing CO2 from a gaseous stream comprising:
    contacting a gaseous stream with a solution, the solution being formed by combining at least:
    a primary or secondary polyamine having an amine concentration of at least 4.0 equivalents/Kg water,
    wherein the amines located on the polyamine are not sterically hindered,
    an alkali salt having a concentration of at least 1.0 equivalents/Kg water, and water;
    wherein no monohydric or polyhydric alcohol is added to the solution;
    whereby contacting removes $CO_2$ from the gaseous stream;
    wherein the alkali salt concentration is selected to prevent precipitation of piperazine carbamate; and
    regenerating the solution.

21. The method of claim 20, wherein the polyamine is piperazine, aminoethylpiperazine, hydroxyethylpiperazine, ethylenediamine, or dimethyl ethylenediamine.

22. The method of claim 20, wherein the alkali salt is potassium carbonate, sodium carbonate, lithium carbonate, bicarbonate salt, a bisulfide salt, or a hydroxide salt.

23. The method of claim 20, wherein the gaseous stream is contacted with the solution at a temperature of approximately 25° C.-120° C.

24. The method of claim 20, wherein the rate constant for the reaction of $CO_2$ with the primary or secondary polyamine ($K_{PZ}$) is at least 25 m³/mol-s at 25° C.

25. The method of claim 20, wherein the solution further comprises an additive.

26. The method of claim 20, wherein the polyamine concentration and the alkali salt concentration are at least 2.3 m.

27. The method of claim 20, wherein the ratio of equivalents of alkali salt to equivalents of polyamine is 0.3-3.0.

28. The method of claim 20, wherein the rate for the solvent-mediated removal of $CO_2$ from the gaseous stream is at least 1.5 times the rate for $CO_2$ removal in a method using an aqueous solution of 5.0-M monoethanolamine.

29. A method of removing CO2 from a gaseous stream comprising: contacting a gaseous stream with a solution, the solution being formed by combining at least:
    a piperazine derivative having an amine concentration of 4.0-10.0 equivalents/Kg water, wherein the amines located on the piperazine derivative are not sterically hindered,
    an alkali salt having a concentration of 4.0-10.0 equivalents/Kg water, and water;
    wherein the concentration of the piperazine derivative and the concentration of the alkali salt are approximately equal;
    wherein no monohydric or polyhydric alcohol is added to the solution;
    whereby contacting removes CO2 from the gaseous stream;
    wherein the alkali salt concentration is selected to prevent precipitation of piperazine carbamate; and
    regenerating the solution.

30. The method of claim 29, wherein the piperazine derivative is piperazine, aminoethylpiperazine, or hydroxyethylpiperazine.

31. The method of claim 29, wherein the alkali salt is potassium carbonate, sodium carbonate, lithium carbonate, a bicarbonate salt, a bisulfide salt, or a hydroxide salt.

32. The method of claim 29, wherein the gaseous stream is contacted with the solution at a temperature of approximately 25° C.-120° C.

33. The method of claim 29, wherein the rate constant for the reaction of $CO_2$ with the piperazine derivative ($K_{PZ}$) is at least 25 m³/mol-s at 25° C.

34. The method of claim 29, wherein the solution further comprises an additive.

35. The method of claim 29, wherein the rate for the solvent-mediated removal of $CO_2$ from the gaseous stream is at least 1.5 times the rate for $CO_2$ removal in a method using an aqueous solution of 5.0-M monoethanolamine.

* * * * *

UNITED STATES PATENT AND TRADEMARK OFFICE
CERTIFICATE OF CORRECTION

PATENT NO. : 8,070,856 B2  
APPLICATION NO. : 10/551834  
DATED : December 6, 2011  
INVENTOR(S) : Rochelle et al.

Page 1 of 1

It is certified that error appears in the above-identified patent and that said Letters Patent is hereby corrected as shown below:

Column 14, line 2, delete "CO2" and insert --$CO_2$-- therefor.

Column 14, line 14, delete "CO2" and insert --$CO_2$-- therefor.

Column 14, line 45, delete "CO2" and insert --$CO_2$-- therefor.

Column 14, line 57, delete "CO2" and insert --$CO_2$-- therefor.

Column 15, line 20, delete "CO2" and insert --$CO_2$-- therefor.

Column 16, line 11, delete "CO2" and insert --$CO_2$-- therefor.

Column 16, line 24, delete "CO2" and insert --$CO_2$-- therefor.

Signed and Sealed this  
Twenty-eighth Day of February, 2012

David J. Kappos  
*Director of the United States Patent and Trademark Office*